(12) United States Patent
Wu

(10) Patent No.: US 10,558,061 B2
(45) Date of Patent: Feb. 11, 2020

(54) LENS WITH STAR-SHAPED OPTICAL ZONE TO INCREASE DEFOCUS IMAGE AREA

(71) Applicant: BRIGHTEN OPTIX CORP., Taipei (TW)

(72) Inventor: I-Tsung Wu, Taipei (TW)

(73) Assignee: Brighten Optix Corp., Taipei (TW)

( * ) Notice: Subject to any disclaimer, the term of this patent is extended or adjusted under 35 U.S.C. 154(b) by 69 days.

(21) Appl. No.: 15/993,995

(22) Filed: May 31, 2018

(65) Prior Publication Data

US 2019/0369412 A1    Dec. 5, 2019

(51) Int. Cl.
 *G02C 7/04*    (2006.01)
 *G02B 7/04*    (2006.01)

(52) U.S. Cl.
 CPC ........ *G02C 7/04* (2013.01); *G02B 7/04* (2013.01)

(58) Field of Classification Search
 CPC .................................. G02C 7/04; G02B 7/04
 USPC ................................. 351/41, 159.01, 159.02
 See application file for complete search history.

(56) References Cited

U.S. PATENT DOCUMENTS

| 8,770,747 B2* | 7/2014 | Corti | G02C 7/046 |
| | | | 351/159.3 |
| 9,658,469 B2* | 5/2017 | Pugh | G02B 1/002 |
| 9,798,162 B2* | 10/2017 | Duis | G02C 7/046 |

* cited by examiner

*Primary Examiner* — Tuyen Tra
(74) *Attorney, Agent, or Firm* — Muncy, Geissler, Olds & Lowe, P.C.

(57) ABSTRACT

A lens with star-shaped optical zone to increase defocus image area is disclosed. The lens includes a central optical area to pass light to image on central imaging area of retina; a peripheral optical area formed around the central optical area and configured to pass light to image on a peripheral image blurring area on peripheral of the central imaging area; a star-shaped optical zone formed on the surface of the central optical area and configured to pass light to clearly image on the central imaging area; and a defocus area formed on a portion of the central optical area other than the optical zone. The defocus area can be used to increase defocus image area of the central imaging area, to extend a range of the optical area having defocus effect on the retina without the need to excessively increasing the defocus power of the lens.

9 Claims, 3 Drawing Sheets

LENS WITH STAR-SHAPED OPTICAL ZONE TO INCREASE DEFOCUS IMAGE AREA

BACKGROUND OF THE INVENTION

1. Field of the Invention

The present invention relates to a lens with a star-shaped optical zone to increase a defocus image area. More particularly, the lens includes a optical zone formed on a surface of a central optical area thereof and configured to pass light to clearly image on a central imaging area of retina, and a defocus area formed on a portion of the central optical area other than the optical zone and configured to increase the defocus image area of the relative central imaging surface area, so that the defocus area can be maximized to slow myopia progression.

2. Description of the Related Art

Generally, in order to correct myopia, most people wear glasses, contact lenses, orthokeratology lenses, or undergo a surgical procedure to permanently and safely correct their myopia. In recent years, manufacturer develops contact lens with a peripheral defocusing area for effectively reducing myopia progression, and such lens is also called peripheral defocusing lens. The principle of the peripheral defocusing lens is that the lens has refractive power relatively different from a center portion thereof to a periphery portion thereof, so that when the light passes through the lens, the focus of a central portion of the lens falls on the retina and the focus of the peripheral portion of the lens falls in the front or if necessary the back of retina, thereby reducing relative peripheral hyperopic defocus effect and slowing axial elongation of the eye. As a result, the peripheral defocusing lens can slow down myopia progression and be effective for peripheral vision correction.

However, the wearer must suffer a short adaptation period when initially wearing the peripheral defocusing lens. Current peripheral defocus lens designs consist of a circular optical zone of either a concentric or annulus rings, the small optical zone diameter of these lens designs significantly degrade the wearer's ability to focus at the horizontal or vertical para-central visual field, for example during reading or horizontal or vertical visual search tasks. For this reason, the conventional peripheral defocusing lens may impact the visual performance of wearing and even affect the safety of the wearer.

Therefore, how to develop new lens to solve the above-mentioned problems is a key issue for the manufacturers in this industry.

SUMMARY OF THE INVENTION

An objective of the present invention is that the lens includes the central optical area formed on a surface thereof and configured to pass light to image on the central imaging area of retina, and a peripheral optical area formed around the central optical area and configured to pass light to image on a peripheral image blurring area on peripheral of the central imaging area; and the lens includes a optical zone formed on a surface of the central optical area thereof, in a star shape and configured to pass light to clearly image on the central imaging area, and a defocus area formed on a portion of the central optical area other than the optical zone and configured to defocus and image on the central imaging area, so that the defocus area can be used to increase entire defocus image area, and the original space of the central optical area can be effectively used to increase the defocus image surface area of the retina. The star-shaped optical zone can ensure the wearer to have clear vision while the wearer's eye ball moves in the horizontal direction or the vertical direction during reading; furthermore, the wearer seldom uses the diagonal portion during reading, so the diagonal portion can be used to increase the defocus image area, so as to extend the area of the optical area having defocus effect on retina for controlling degrees of myopia without increasing the defocus degree of the lens. Following animal studies that have demonstrated the strong inhibitory effect of peripheral myopic defocus on axial length elongation or myopia development, it has been hypothesized that inducing myopic retinal defocus may slow down or stop the progression of myopia in children. Contact lenses provide the most viable opportunity to beneficially modify genetics and environment factors through their close alignment with the eye and consistent wearing time. The present invention will induce myopic retinal defocus by the star-shaped optical zone that provide myopic blur to the retina, which acts as a putative cue to slow myopic eye growth.

Another objective of the present invention is that a plurality of convex part is formed on the optical zone, and a corner of each convex part is in circular arc shape, so that when lens is worn on eye ball, the circular arc-shaped corners can improve the wearer's comfort of wearing without feeling sharp sensation of foreign body.

BRIEF DESCRIPTION OF THE DRAWINGS

The structure, operating principle and effects of the present disclosure will be described in detail by way of various embodiments which are illustrated in the accompanying drawings.

DETAILED DESCRIPTION OF THE PREFERRED EMBODIMENTS

Figure 1:
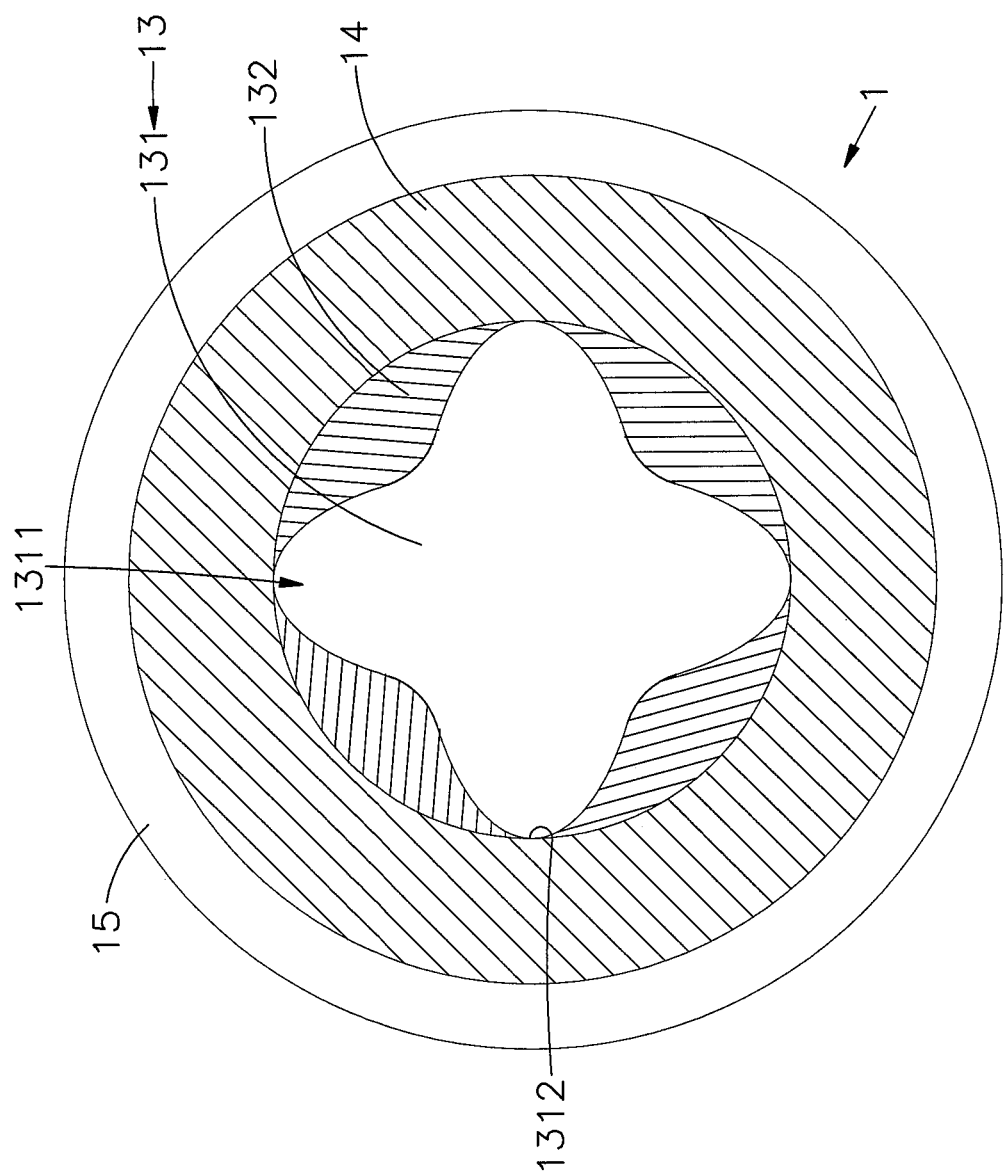
FIG. 1 is a schematic plan view of embodiment of the present invention.

The following embodiments of the present disclosure are herein described in detail with reference to the accompanying drawings. These drawings show specific examples of the embodiments of the present disclosure. It is to be understood that these embodiments are exemplary implementations and are not to be construed as limiting the scope of the present disclosure in any way. Further modifications to the disclosed embodiments, as well as other embodiments, are also included within the scope of the appended claims. These embodiments are provided so that this disclosure is thorough and complete, and fully conveys the inventive concept to those skilled in the art. Regarding the drawings, the relative proportions and ratios of elements in the drawings may be exaggerated or diminished in size for the sake of clarity and convenience. Such arbitrary proportions are only illustrative and not limiting in any way. The same reference numbers are used in the drawings and description to refer to the same or like parts.

It is to be understood that, although the terms 'first', 'second', 'third', and so on, may be used herein to describe various elements, these elements should not be limited by these terms. These terms are used only for the purpose of distinguishing one component from another component. Thus, a first element discussed herein could be termed a second element without altering the description of the present disclosure. As used herein, the term "or" includes any and all combinations of one or more of the associated listed items.

It will be understood that when an element or layer is referred to as being "on," "connected to" or "coupled to" another element or layer, it can be directly on, connected or coupled to the other element or layer, or intervening elements or layers may be present. In contrast, when an element is referred to as being "directly on," "directly connected to" or "directly coupled to" another element or layer, there are no intervening elements or layers present.

In addition, unless explicitly described to the contrary, the word "comprise" and variations such as "comprises" or "comprising", will be understood to imply the inclusion of stated elements but not the exclusion of any other elements.

Figure 2:
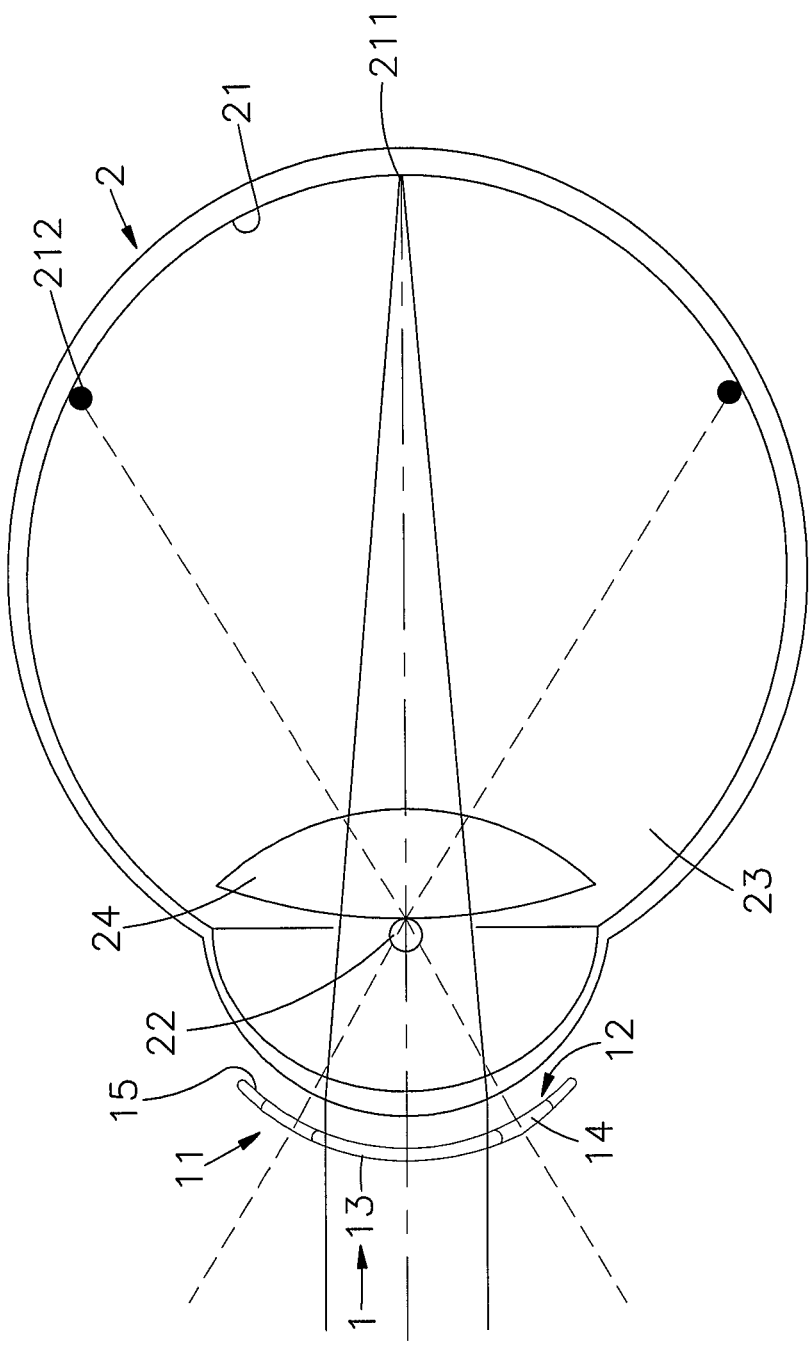
FIG. 2 is a schematic view of optical paths of an embodiment of the present invention.
Figure 3:
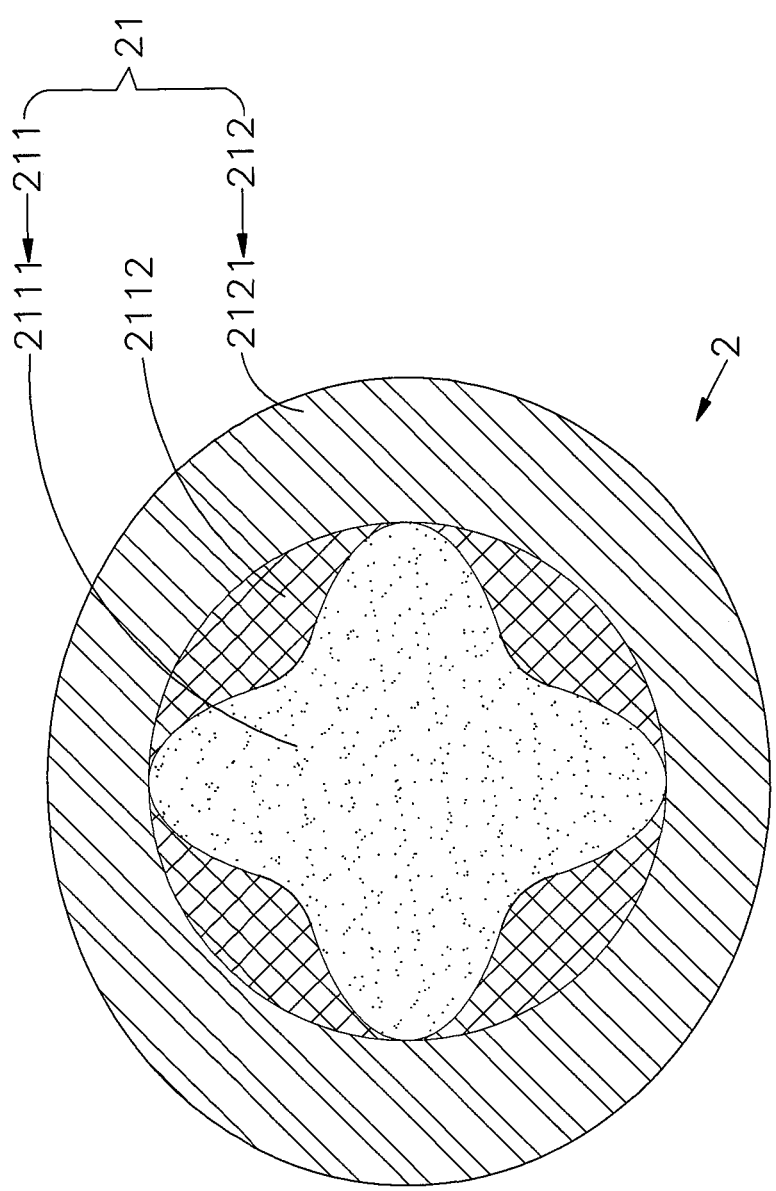
FIG. 3 is a schematic view of process of imaging on retina, according to an embodiment of the present invention.

Please refer to FIGS. 1 to 3. In an embodiment of the present invention, a lens 1 can a contact lens or spectacles. The lens 1 includes an outer surface 11, an inner surface 12, and a central optical area 13 formed on the outer surface 11 and the inner surface 12 and configured to pass light to image on a central imaging area 211 of retina 21 of eye ball 2. In this embodiment, the central imaging area 211 is macular fovea of the retina 21. The central optical area 13 includes an optical zone 131 formed on a surface thereof and in non-circular shape, for example, the optical zone 131 is an approximate-star-shaped optical zone 131. The optical zone 131 includes a plurality of convex parts 1311 extended to periphery of the central optical area 13 in vertical and horizontal directions both, and each convex part 1311 include a circular-arc-shaped corner 1312 formed on an end portion thereof. The central optical area 13 includes a defocus area 132 formed on a portion thereof other than the optical zone 131. A number of the defocus area 132 can be one or more. A peripheral optical area 14 is formed around the central optical area 13 and configured to pass light to image on the peripheral image blurring area 212 on peripheral of the central imaging area 211, that is, the peripheral optical area 14 is macular parafovea surrounding the peripheral of fovea. The lens 1 includes a positioning part 15 formed on the surface thereof and configured to prevent rotation of the lens 1.

Preferably, the optical zone 131 and the defocus area 132 of the central optical area 13 are formed on the outer surface 11 of the lens 1; however, in actual application, the optical zone 131 and defocus area 132 of the lens 1 can be formed on the inner surface 12, or each of the outer surface 11 and the inner surface 12 is provided with the optical zone 131 and the defocus area 132.

Furthermore, the optical zone 131 of the central optical area 13 includes the plurality of convex parts 1311 extended in vertical and horizontal directions both, so that light passing through the plurality of convex parts 1311 can clearly image on the retina 21 while pupil 22 of the eye ball 2 moves in vertical or horizontal direction for viewing or browsing. The plurality of convex parts 1311 of the optical zone 131 can satisfy the wearer's need for clear vision image, for example, during reading, the eye ball 2 moves in the horizontal direction or the vertical direction for browsing text, the plurality of convex parts 1311 can meet the need in reading. Furthermore, the other area of the central optical area 13 through which the wearer does not need to see clearly, can be used as the defocus area 132 of the central optical area 13, for example, the wearer seldom uses the diagonal portions during reading, so the diagonal portion can be used as the defocus area 132 to increase the defocus image area. The defocus area 132 of the central optical area 13 is formed on a position of the lens 1 correspondingly to the pupil 22 of the lens 1 when the eye ball 2 watches in diagonal direction.

The refractive powers of the defocus area 132 of the central optical area 13 and the peripheral optical area 14 are lower than the refractive power of the optical zone 131 of the central optical area 13, so that the lens 1 can have peripheral defocus effect. Preferably, the refractive power of the defocus area 132 is equal to that of the peripheral optical area 14.

In an embodiment, the lens 1 can be contact type, Preferably, the positioning part 15 of the contact-type lens 1 can be disposed on peripheral of the inner surface 12 without affecting arrangement of the central optical area 13 and the peripheral optical area 14, so as to facilitate processing and formation of the central optical area 13 and the peripheral optical area 14; however, in actual application, the positioning part 15 can be disposed on the outer surface 11 of the lens 1, or each of the outer surface 11 and the inner surface 12 is provided with the positioning part 15. In an embodiment, in order to form the positioning part 15, an upper edge and a lower edge of the inner surface 12 can be cut to be thinner, so as to form position-limiting grooves (not shown in FIGs) on the upper edge and the lower edge, respectively, so that the lens 1 can be positioned on the eye ball 2 by the plurality of position-limiting grooves to prevent rotation. It should be noted that there are various manners or structures useful for positioning the lens 1 on the eye ball 2, so numerous modifications, variations and enhancements can be made thereto by those skilled in the art without departing from the spirit and scope of the disclosure set forth in the claims. In an embodiment, the lens 1 can be spectacles, and the positioning part 15 can be a frame to wear and position the lens 1 on the wearer's face.

In order to use the lens 1 of the present invention, the lens 1 can be worn on eye ball 2, and then positioned on the eye ball 2 by the positioning part 15, so as to prevent the lens 1 from easily rotating on the eye ball 2. The light passing the peripheral optical area 14 may image on the peripheral image blurring area 212 of retina 21 to form a first defocus image 2121, as shown in FIG. 3; and when light passes the central optical area 13, the light passing the optical zone 131 of the central optical area 13 may image on the central imaging area 211 of retina 21 to form a clear image 2111, and the light passing the defocus area 132 of the central optical area 13 may image on the area of the central imaging area 211 other than the clear image 2111, to form a second defocus image 2112. As a result, the defocus area 132 can be used to increase the defocus image area of retina 21.

When the wearer's eye ball 2 moves in horizontal or vertical direction for browsing external object, the clear image 2111 can be formed on the central imaging area 211 through the plurality of convex parts 1311 on the optical zone 131, so that the wearer can clearly view external object in horizontal and vertical directions; furthermore, the light passing the defocus area 132 forms the second defocus image 2112 which can be used to increase the defocus image area, thereby increasing the range of the optical area of retina 21 with defocus effect. By using the lens of the present invention, myopia progression can be controlled without the need for excessively increasing the defocus power of the lens 1, so as to reduce the required defocus power of the lens, and also reduce possibility that the visual performance in central vision field is affected by excessive degrees power, As a result, the defocus area 132 with lower refractive power (more ADD) can be used for defocusing the image and provide myopic blur to the retina, which acts as a putative cue to slow myopic eye growth.

The lens of the present invention has following advantages.

First, the central optical area 13 of the lens 1 can include the defocus area 132 in the diagonal area, so that the original space of the central optical area 13 can be effectively used to increase the defocus image area of the retina 21 of eye ball 2. Because the defocus image area is increased, the area of the retinal defocus surface with defocus effect can be extended; as a result, degrees of myopia can be controlled without the need to excessively increasing the defocus degree of the lens 1, the required degree of defocus can be reduced, and the possibility that the visual performance in central vision field is affected by excessive degrees of defocus can also be reduced. The present invention will induce myopic retinal defocus by the asymmetric optical zone that provide myopic blur to the retina, which acts as a putative cue to slow myopic eye growth.

Secondly, each of the plurality of convex parts 1311 of the optical zone 131 includes a circular-arc-shaped corner 1312 formed on the end portion thereof, so that the wearer can have better comfort of wearing without feeling sharp sensation of foreign body when the contact-type lens 1 is worn on the eye ball 2.

The present disclosure disclosed herein has been described by means of specific embodiments. However, numerous modifications, variations and enhancements can be made thereto by those skilled in the art without departing from the spirit and scope of the disclosure set forth in the claims.

What is claimed is:

1. A lens with a star-shaped optical zone to increase defocus image area, and the lens comprising:
    an outer surface;
    an inner surface;
    a central optical area formed on the outer surface and the inner surface, and configured to pass light to image on a central imaging area of retina of eye ball, wherein a optical zone is formed in a star shape, on a surface of the central optical area and configured to pass light to clearly image on the central imaging area of the retina, and the optical zone comprises a plurality of convex parts extended in a vertical direction and a horizontal direction, wherein a defocus area is formed on a portion of the central optical area other than the optical zone and configured to increase defocus image range of the central imaging area;
    a peripheral optical area formed around the central optical area and configured to pass light to image on a peripheral image blurring area on peripheral of the central imaging area; and
    a positioning part formed on the surface thereof and configured to prevent lens rotation.

2. The lens according to claim 1, wherein the optical zone of the central optical area is in a non-circular shape.

3. The lens according to claim 1, wherein the optical zone and the defocus area of the central optical area are disposed on the outer surface of the lens.

4. The lens according to claim 1, wherein the optical zone and the defocus area of the central optical area are disposed on the inner surface of the lens.

5. The lens according to claim 1, wherein each of the outer surface and the inner surface of the lens is provided with the optical zone and the defocus area formed thereon.

6. The lens according to claim 1, wherein the plurality of convex parts formed on the optical zone are extended to the periphery of the central optical area.

7. The lens according to claim 1, wherein each of the plurality of convex parts of the optical zone comprises a circular-arc-shaped corner.

8. The lens according to claim 1, wherein refractive powers of the defocus area of the central optical area and the peripheral optical area are lower than refractive power of the optical zone, and preferably refractive power of the defocus area is equal to refractive power of the peripheral optical area.

9. The lens according to claim 1, wherein the positioning part is formed on an edge of the inner surface of the lens.

* * * * *